2,178,138

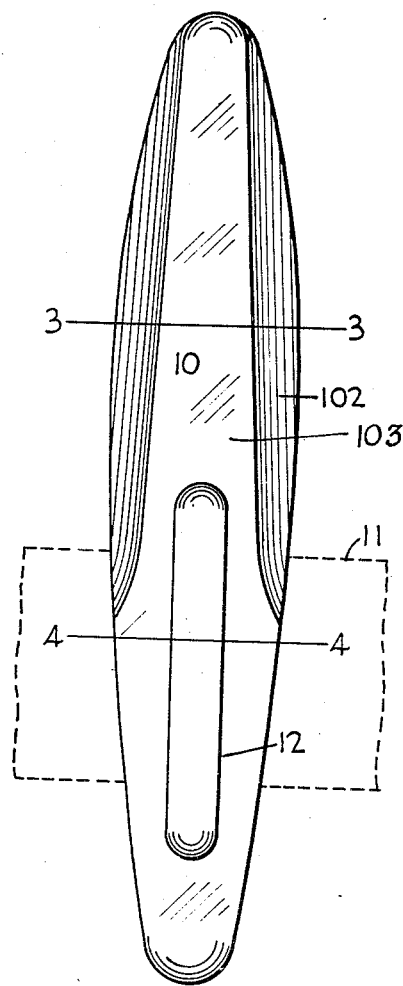
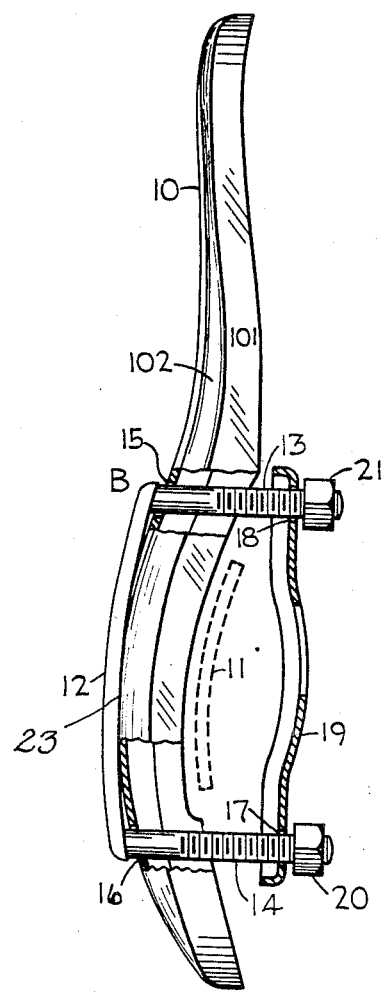
Fig. 1
Fig. 2
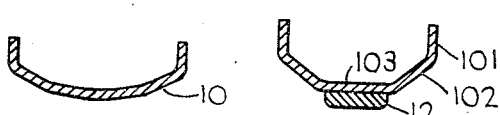
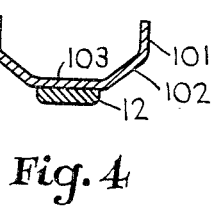
Fig. 3
Fig. 4
Norman W. Cummins
INVENTOR Patented Oct. 31, 1939

UNITED STATES PATENT OFFICE 2,178,138

VERTICAL EXTENSION FOR VEHICLE BUMPERS

Norman W. Cummins, Louisville, Ky., assignor, by mesne assignments, to American Chain & Cable Company, Inc., New York, N. Y., a corporation of New York Application March 1, 1937, Serial No. 128,311

4 Claims. (Cl. 293—55)

My invention relates to improvements in vehicle bumpers of the type equipped with vertical extension members.

An object of the invention is to provide a vertical bumper extension of relatively light material, formed to possess relatively great strength and a means for attaching the extension to a co-related horizontal bumper bar wherein the extension will be strengthened by the device which secures it to the bar.

Another object of the invention is to simplify the structure by providing a single bolt for securing a vertical bumper extension to its associated bar.

With the foregoing and other objects, which will be revealed as the description of the details of the apparatus proceeds and hereinafter claimed, it must be understood that changes from the selected embodiment of my invention can be made without departing from the scope of my invention.

A preferred embodiment of my invention has been illustrated in the accompanying drawing in which—

Fig. 1 is a front elevation of a vertical extension attached to a section of a horizontal bumper bar.

Fig. 2 is a side elevation of Fig. 1 with a section removed to reveal structure and the relation of the component parts, just before final assembly with a horizontal bumper bar, indicated by dotted lines.

Fig. 3 is a cross section of Fig. 1 on line 3, 3.

Fig. 4 is a cross section of line 4, 4 of the parts visible in Fig. 1.

Numeral 10 designates a vertical extension bumper bar formed as a shell from sheet metal, while 11 designates a horizontal bumper bar to which the extension is attached by means of a straddle bolt or clamping plate, designated generally by B. This bolt consists of a body section 12, and two threaded shanks 13, 14, projecting through perforation 15, 16 in extension 10. These shanks also project through holes 17, 18 formed in the yoke or tie plate 19, adapted to engage the rear face of bar 11. The numerals 20 and 21 designate nuts, which cooperate with the bolt and yoke to constitute a clamp to secure extension 10 to the bumper bar 11. As a means of providing adaptability for attachment to many forms of horizontal bumper bars, yoke 19 can be reversed from the position shown.

The cross sectional arch structure as shown in Figs. 3 and 4 of the extension per se has been organized with a vertical continuous marginal reinforcing rib 101 depending from diagonals or springers 102 which are in turn connected by the top 103 which in turn can be regarded as the keystone of the arch. It should be noted that following the tightening of the bolt during assembly, the force applied to the bolt is transmitted to that section of the extension which lies between shanks 13, 14 entirely through the extrados of the arch.

In Fig. 2 the body or unthreaded section 12 of the bolt is shown as having only one point of contact 23 with the outside face of the extension. This is to represent the assembly just prior to the final tightening of the device to the bumper bar. Incident to tightening the nuts, to effect final assembly, the first applied pressure causes the body of the bolt to engage the extension at point 23. In response to further pressure, either the top or body of the bolt B or the adjacent face of the extension 10, or possibly both of these members must yield until the indicated gap is entirely closed. While this is a preferred form, the body of the bolt and the adjacent surface of the extension can be formed on substantially the same arc.

In the disclosed structure and the means for securing the vertical extension to the horizontal bar, the section embraced thereby is obviously reinforced, which in turn serves to strengthen the entire extension. Under collision, when the impact falls above or below the section embraced by the bolt, the line of contact between the extension and the near edge of the horizontal bar becomes the fulcrum whereupon the resulting multiplied force, by reason of the leverage, tends to bulge the section between shanks 13, 14, consequently the reinforcement provided by the straddle bolt resists forces that would distort or destroy the vertical extension were it secured by means of a clamping or other device that did not embrace and reinforce. Thus it will be noted that the invention includes a serviceable bumper extension of simplified structure having great strength of relatively light weight, also effecting simple means for attachment.

Having described my invention, I claim:

1. A vertical guard adapted to be secured against the front face of a horizontal bumper bar and to project a substantial distance beyond at least one edge thereof, and a U-shaped securing means for securing the vertical guard to the bumper bar, the transverse member of said securing means extending in the direction of the length of the vertical guard and engaging the same along a line substantially co-extensive with the depth of the bumper bar, the rearwardly extending members by means of which the vertical guard is secured to the bumper bar being spaced to extend above and below the edges of the bumper bar, said transverse member of said securing means operating to prevent bulging of the portion of the vertical guard in front of the bumper bar under impacts against the projecting portion of the vertical guard.

2. A vertical guard adapted to be secured against the front face of a horizontal bumper bar and to project a substantial distance beyond at least one edge thereof, said vertical guard being provided with vertically aligned apertures spaced at least at as great a distance as the depth of the bumper bar, and a U-shaped securing means having its transverse member extending longitudinally of the vertical guard and in contact with the front face thereof between said apertures, and having its rearwardly extending members by means of which the vertical guard may be secured to the bumper bar projecting through said apertures above and below the edges of the bumper bar, said transverse member of the U-shaped securing means operating to prevent bulging of the portion of the vertical guard in front of the bumper bar under impacts against the projecting portion of the vertical guard.

3. A vertical guard adapted to be secured to the front face of a horizontal bumper bar and provided with a projecting portion extending a substantial distance beyond at least one edge of said bumper bar, said vertical guard comprising a crown and rearwardly extending flanges, the flanges being recessed to receive the bumper bar and the crown being provided with apertures located above and below the edges of the bumper bar, and a U-shaped securing means having its transverse member in contact with the front face of the crown between the apertures, and having its rearwardly extending members projecting through said apertures adjacent the upper and lower edges of the bumper bar by means of which the vertical guard is secured to the bumper bar, said transverse member operating to prevent bulging of the crown of the guard under impact against the projecting portion of the guard.

4. A vertical guard comprising an elongated member having rearwardly extending flanges adapted to be seated against the front face of horizontal bumper bar and being of a length to project beyond at least one edge of the bumper bar, the front member of the vertical guard being provided with vertically alined apertures spaced above and below the edges of said bumper bar, and a U-shaped securing means having its transverse member in engagement with the front face of the vertical guard and having its rearwardly extending members projecting through the apertures in the vertical guard constituting means by which the vertical guard may be secured to the bumper bar, the front face of the vertical guard being curved in the direction of its length and the transverse member of the U-shaped securing means being also curved in the direction of its length but on a greater radius of curvature than that of the face of the vertical guard.

NORMAN W. CUMMINS.